US00RE48061E

(19) United States
(12) Reissued Patent
Lin et al.

(10) Patent Number: US RE48,061 E
(45) Date of Reissued Patent: Jun. 23, 2020

(54) SWIMMING POOL LADDER

(71) Applicant: Intex Marketing Ltd., Tortola (VG)

(72) Inventors: Hua Hsiang Lin, Fujian (CN); Shen Wu Wong, Fujian (CN)

(73) Assignee: Intex Marketing Ltd., Tortola (VG)

(21) Appl. No.: 16/033,163

(22) Filed: Jul. 11, 2018

Related U.S. Patent Documents

Reissue of:
(64) Patent No.: 6,755,281
Issued: Jun. 29, 2004
Appl. No.: 10/047,120
Filed: Jan. 13, 2002

(51) Int. Cl.

| | |
|---|---|
| ***E04H 4/14*** | (2006.01) |
| ***E04H 4/00*** | (2006.01) |
| ***E06C 7/08*** | (2006.01) |
| ***E06C 7/00*** | (2006.01) |

(52) U.S. Cl.
CPC ..... *E04H 4/14* (2013.01); *E04H 4/00* (2013.01); *E06C 7/00* (2013.01); *E06C 7/08* (2013.01)

(58) Field of Classification Search
CPC ..... E04H 4/144; E06C 7/08; E06C 7/081
USPC ..... 182/118, 228.4
See application file for complete search history.

(56) References Cited

U.S. PATENT DOCUMENTS

| | | | | |
|---|---|---|---|---|
| 1,349,125 | A | 8/1920 | Full | |
| 2,992,697 | A | 7/1961 | Klages | |
| D208,630 | S * | 9/1967 | Wesley | D25/66 |
| 3,586,124 | A * | 6/1971 | Kunzweiler et al. | 182/57 |
| 3,820,801 | A | 6/1974 | Lindler | |
| 3,829,935 | A | 8/1974 | Critchfield | |
| 3,858,683 | A | 1/1975 | Rachocki | |
| 3,871,780 | A | 3/1975 | Svensson | |
| 3,908,795 | A | 9/1975 | Gannon | |
| 3,944,024 | A | 3/1976 | Adas | |
| 4,025,216 | A | 5/1977 | Hives | |
| 4,189,123 | A | 2/1980 | Johnson | |
| 4,193,477 | A * | 3/1980 | Broyles | 182/194 |
| 4,247,216 | A | 1/1981 | Pansini | |
| 4,471,854 | A | 9/1984 | Heilskov | |
| 4,474,515 | A | 10/1984 | Pitzer | |

(Continued)

FOREIGN PATENT DOCUMENTS

| | | |
|---|---|---|
| EP | 0 607 740 | 7/1994 |
| EP | 0 644 314 A1 | 3/1995 |

(Continued)

*Primary Examiner* — Terrence R Till
(74) *Attorney, Agent, or Firm* — Faegre Drinker Biddle & Reath LLP

(57) ABSTRACT

A swimming pool ladder typically utilized with a large capacity swimming pool for enabling bathers to conveniently enter and exit the pool. In its most fundamental embodiment, the swimming pool ladder includes a first ladder section connected to a second ladder section by a top platform. Each ladder section includes a pair of J-shaped side rails for providing a ladder frame. A plurality of rung anchors are mounted upon each of the side rails for supporting a plurality of rungs. Each of the rung anchors includes a load bearing flange. Further, each of the rungs includes a pair of U-shaped openings and a pair of grooves formed within the U-shaped openings for receiving and cooperating with one of the run anchors and the corresponding load bearing flange. Finally, a plurality of retainer pins are provided for removably securing the rungs to the rung anchors.

18 Claims, 9 Drawing Sheets

(56) References Cited

U.S. PATENT DOCUMENTS

| | | | |
|---|---|---|---|
| 4,597,687 | A | 7/1986 | Colas |
| 4,621,937 | A | 11/1986 | Maccuaig |
| 4,648,616 | A | 3/1987 | Diekman et al. |
| 4,656,721 | A | 4/1987 | Werner |
| 4,685,706 | A | 8/1987 | Kowal et al. |
| 4,716,987 | A | 1/1988 | Lindberg, Jr. |
| 4,858,938 | A | 8/1989 | Terwilliger et al. |
| 4,951,746 | A | 8/1990 | Setterberg, Jr. |
| 4,967,879 | A | 11/1990 | Klafs |
| 4,997,061 | A | 3/1991 | Aymes |
| 5,005,668 | A | 4/1991 | Nowlan |
| 5,064,228 | A | 11/1991 | Bisbing |
| 5,230,539 | A | 7/1993 | Olson |
| 5,240,289 | A | 8/1993 | Gottling et al. |
| 5,251,986 | A | 10/1993 | Arena |
| 5,267,806 | A | 12/1993 | Bock |
| 5,284,369 | A | 2/1994 | Kitamura |
| 5,341,559 | A | 8/1994 | Reid et al. |
| 5,388,665 | A | 2/1995 | Newman |
| 5,417,503 | A | 5/1995 | Brennan, III |
| 5,427,198 | A | 6/1995 | Walsh |
| 5,465,638 | A | 11/1995 | Mesmer |
| 5,495,425 | A | 2/1996 | Kanaan |
| 5,542,717 | A | 8/1996 | Rea et al. |
| 5,547,041 | A | 8/1996 | Morral Gispert |
| 5,584,404 | A | 12/1996 | Tsai |
| 5,738,387 | A | 4/1998 | Guest |
| 5,882,139 | A | 3/1999 | Valin |

FOREIGN PATENT DOCUMENTS

| | | |
|---|---|---|
| EP | 064431 B1 | 3/1995 |
| EP | 0 644 314 B1 | 10/1997 |
| FR | 1214561 | 4/1960 |
| FR | 1530108 | 7/1967 |
| FR | 1484080 | 9/1967 |
| FR | 1530108 | 10/1968 |
| FR | 2230847 | 12/1974 |
| FR | 2369411 | 5/1978 |
| FR | 1484080 | 6/1996 |
| GB | 0657746 | 9/1951 |
| GB | 657746 | 9/1951 |
| GB | 1089761 | 11/1967 |
| GB | 1203572 | 8/1970 |
| GB | 2235236 | 2/1991 |
| GB | 2251262 | 7/1992 |

* cited by examiner

SWIMMING POOL LADDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Technical Field

The present invention relates to swimming pool apparatus. More specifically, the present invention relates to methods and apparatus for a swimming pool ladder having a plurality of rung anchors permanently affixed onto a pair of parallel side rails for mounting rungs thereon and intended to support the body weight of bathers climbing into and out of a large capacity above-the-ground swimming pool.

2. Background Art

The prior art is directed to methods and apparatus for ladders typically used in large capacity above-the-ground swimming pools for facilitating entry into and egress from the swimming pool.

Above-the-ground swimming pools for use by adults and children alike have become very popular in recent years. These pools are typically erected, for example, in the back yard of a residence and typically have the capacity to hold over one-thousand gallons of water. Above-the-ground swimming pools of this size typically can accommodate several adults and children at any one time. Several types of above-the-ground large capacity swimming pools are known in the art. For example, one style of older swimming pool is comprised of a circular metal boundary or wall that requires reinforcing to withstand the lateral component of force caused by the water volume. Another type of an above-the-ground swimming pool is one that utilizes a circular frame comprised of spaced rigid stanchions employed for supporting a plastic polymer liner, such as polyvinylchloride, utilized to contain the volume of water. A third type of swimming pool is one that includes single or multiple inflated air chambers that vertically support the sidewall of a plastic polymer liner as the swimming pool is filled with water.

Each of these large capacity above-the-ground swimming pools requires a means for conveniently entering and exiting the swimming pool so as not to damage the support structure or sidewall of the swimming pool. The method employed in the prior art to enter and exit the pool has been a ladder designed for such use. These ladders can be comprised of metallic supports and plastic components, be lightweight and high strength. This type of ladder typically used in a swimming pool has been known in the past. An example of this type of ladder includes a pair of uprights having a means for attaching a plurality of rungs there between.

In the example being described, a pair of metallic uprights each have a recess on their edges at the location where the step rungs are to be attached. This task is achieved by press drawing the uprights resulting in two opposite and arched recesses separated by two opposite ridges. Two plastic split sleeves are attached on the uprights in each opposite recess by hand threading them onto the uprights. The sleeves are open on one of their generating lines and the opposite generating line has a reduction in thickness. This design creates a plastic hinge affect which allows the sleeve to open to attach it crossways to the upright. In the threading operation of the split sleeve onto the upright (at the location of the recess formed on the upright), a protrusion is fitted in the split sleeve which matches the inside of the split sleeve to the recess on the uprights. This feature enables the split sleeve to achieve a grip (as well as proper location) which prevents coaxial displacement of the split sleeve on the metallic upright and ensures that all rungs will be parallel to each other.

A rung of the ladder is supported and held on the split sleeve by and at its ends. The rung includes two tubular sleeves or tunnels having uninterrupted inner surfaces on these ends which rest on a lower flange of the outer edge of the split sleeve. This attachment in turn keeps the sleeve tightly applied against the upright. To prevent accidental upward displacement of the rung once it is attached, an elastic finger finished with an outer conical rib has been fitted on the edge of the sleeve. The conical rib catches on the edge of the tubular sleeve of the rung to prevent upward displacement of the rung.

This ladder typically designed for use with a swimming pool is characteristic of the current state of the art. Notwithstanding the above described rung sections of the ladder can be assembled without use of tools and fasteners, it is noted that each individual split sleeve must be hand threaded along the entire length of the corresponding metallic upright and positioned over the corresponding recess formed in the upright. Thereafter, each metallic upright with the split sleeves attached thereto must be passed through each corresponding tubular sleeve on each rung in order to assemble the ladder. This results in a time consuming process requiring some physical exertion and patience to achieve assembly.

Thus, there is a need in the art for a swimming pool ladder typically used with a large capacity above-the-ground swimming pool and having a first ladder section and a second ladder section where the second ladder section is inserted into the swimming pool, each ladder section including two pairs of J-shaped side rails each having a plurality of rung anchors permanently affixed thereto, the rung anchors each comprising coplanar surfaces and a load bearing flange each of which corresponds to and cooperates with the construction of each corresponding rung, each rung being conveniently assembled to and disassembled from the corresponding rung anchor with a plurality of slotted retainer pins, the ladder further including a top platform and safety handrails for use by a bather.

DISCLOSURE OF THE INVENTION

Briefly, and in general terms, the present invention provides a new and improved swimming pool ladder for use with large capacity above-the-ground swimming pools. The inventive swimming pool ladder includes a first ladder section and a second ladder section which are connected by a top platform having a pair of safety handrails. The first ladder section is securely positioned on the ground side while the second ladder section is inserted into the swimming pool to enable bathers to conveniently enter and exit the swimming pool.

In a preferred embodiment, the swimming pool ladder includes a first ladder section and a second ladder section with each ladder section having a pair of J-shaped side rails for providing a ladder frame. Each of the pair of side rails includes a plurality of rung anchors permanently affixed to the side rails for supporting a plurality of rungs which in turn support the body weight of the bather climbing the ladder. Each of the rung anchors comprise a load bearing flange and a cylinder body upon which the load bearing flange is formed. Each rung includes a pair of U-shaped openings for receiving the cylinder body of each of a corresponding pair of rung anchors mounted on each of a corresponding pair of side rails. Each U-shaped opening of each rung further includes a groove for receiving the load bearing flange of each of the pair of corresponding rung anchors mounted on the pair of corresponding side rails in a tongue and groove construction.

Each rung anchor also includes a pair of coplanar surfaces which correspond to and cooperate with the construction of each corresponding rung. A first coplanar surface of each rung anchor aligns with a top surface of the corresponding rung while a second coplanar surface of each rung anchor aligns with a rear surface of the corresponding rung. Consequently, when a particular rung is mounted upon the corresponding rung anchor, the U-shaped openings formed in each rung are closed. This feature eliminates any possibility of accidental tripping by a bather while climbing the inventive swimming pool ladder. Finally, each of the rungs is conveniently assembled to and disassembled from the corresponding rung anchor mounted on the side rails by employing a plurality of slotted retainer pins. The retainer pins are inserted into a plurality of penetrations formed in the top surface of each rung and in the load bearing flange of each rung anchor. When assembled, the penetrations formed in each rung are aligned with the penetrations formed in each corresponding rung anchor.

The cylinder body of each of the rung anchors includes a plurality of protuberances formed therein. Additionally, each of the J-shaped side rails includes a corresponding plurality of compression indentations formed therein. The protuberances formed on the inside of the cylinder body cooperate with the compression indentations formed on the side rails to maintain the rung anchors in position on the side rails. Additionally, each of the rung anchors are ultrasonically welded to the corresponding side rail. The J-shaped side rails and the safety hand rails are each comprised of cylindrical metal tubing. However, the rungs, rung anchors and top platform are comprised of high strength plastic. Each of the rungs includes a heavy duty construction having a reinforced lattice structure in the under surface thereof. Each of the rung anchors exhibit a construction that exceeds the industry accepted strength requirements.

The present invention is generally directed to a swimming pool ladder typically utilized with a large capacity swimming pool for enabling bathers to conveniently enter and exit the swimming pool. In its most fundamental embodiment, the swimming pool ladder for use with a large capacity swimming pool exhibits a construction having a first ladder section connected to a second ladder section by a top platform. This ladder construction provides an entry and an exit to the large capacity swimming pool. Each of the ladder sections includes a pair of J-shaped side rails for providing a ladder frame. A plurality of rung anchors are mounted upon each of the side rails for supporting a plurality of rungs. Each of the rung anchors includes a load bearing flange. Further, each of the rungs includes a pair of U-shaped openings and a pair of grooves formed within the U-shaped openings for receiving and cooperating with one of the rung anchors and the corresponding load bearing flange. Finally, a plurality of retainer pins are provided for removably securing the rungs to the rung anchors.

These and other objects and advantages of the present invention will become apparent from the following more detailed description, taken in conjunction with the accompanying drawings which illustrate the invention, by way of example.

DETAILED DESCRIPTION OF THE INVENTION

Figure 1:
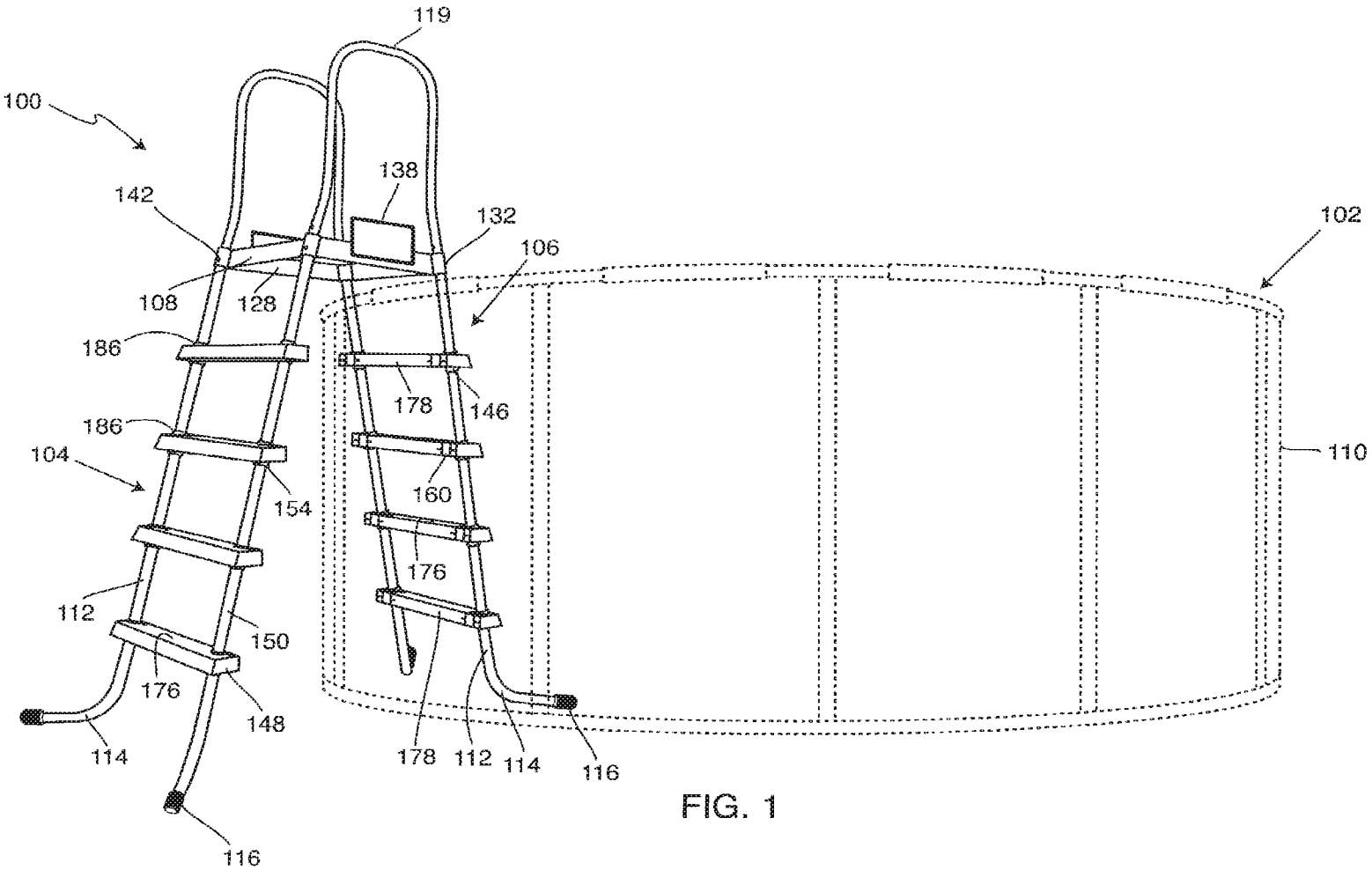
FIG. 1 is a perspective view of a swimming pool ladder of the present invention showing a first ladder section and a second ladder section, a connecting fop platform, safety hand rails, and a plurality of rungs suspended between J-shaped side rails, where the ladder is shown straddling a sidewall of a large capacity above-the-ground swimming pool.
Figure 2:
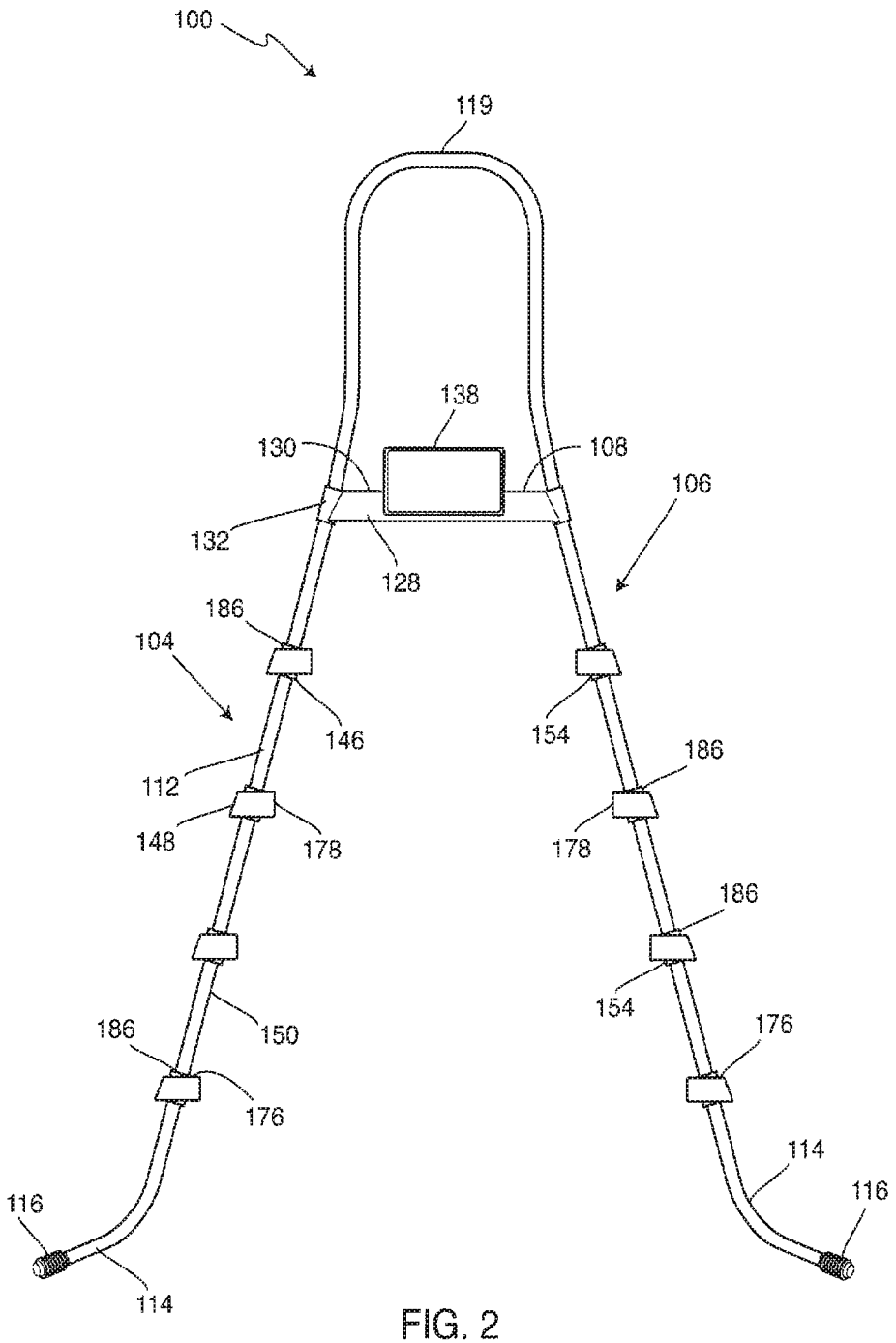
FIG. 2 is a side elevation of the swimming pool ladder of FIG. 1 showing the ends of the plurality of rungs connected to the J-shaped side rails, top platform and a safety hand rail.
Figure 4:
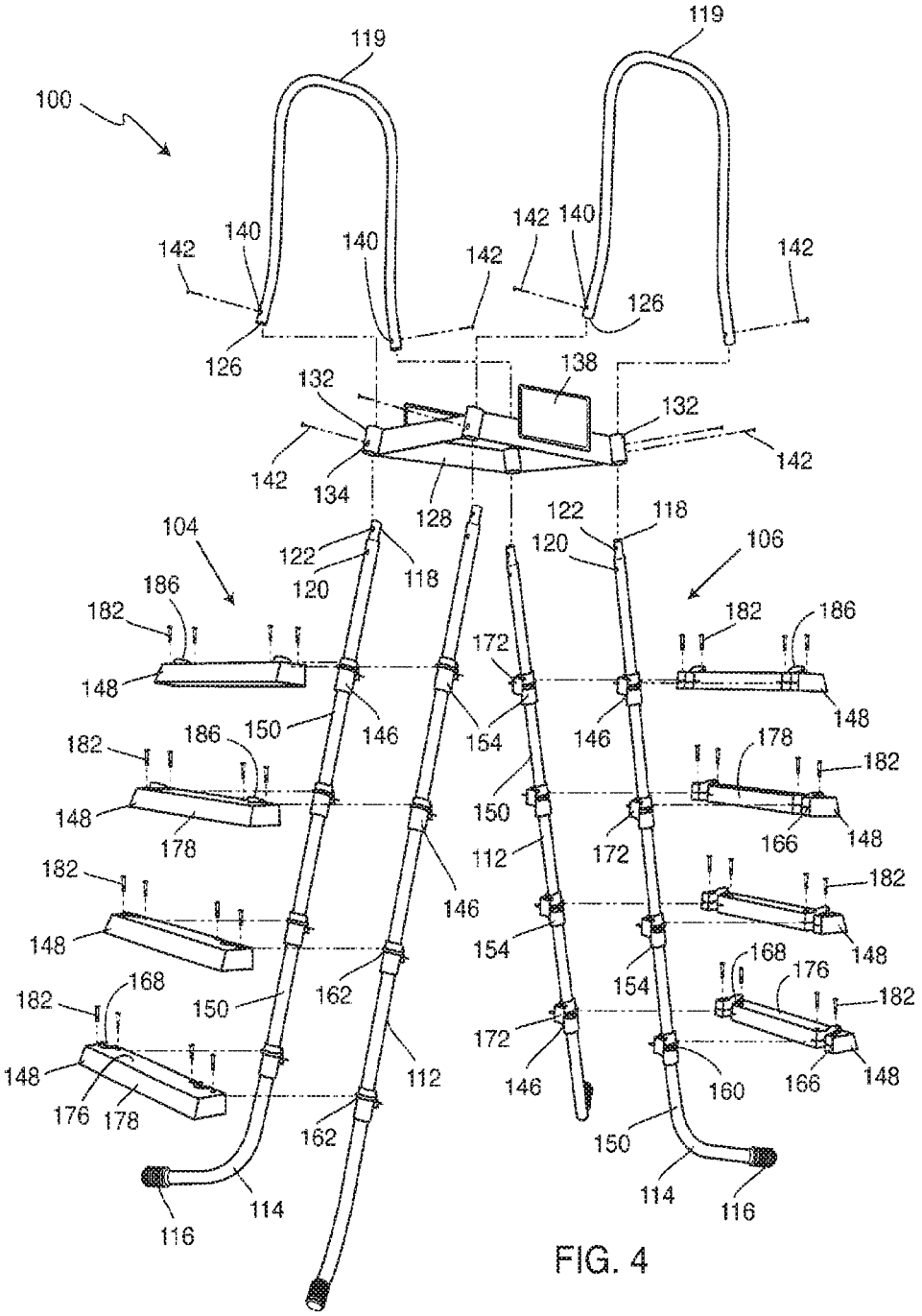
FIG. 4 is an exploded prospective view of the swimming pool ladder of FIG. 1 showing the first ladder section and the second ladder section including two sets of the J-shaped side rails with a plurality of rung anchors and retainer pins mounted thereon, the plurality of rungs and the top platform and handrails.
Figure 5:
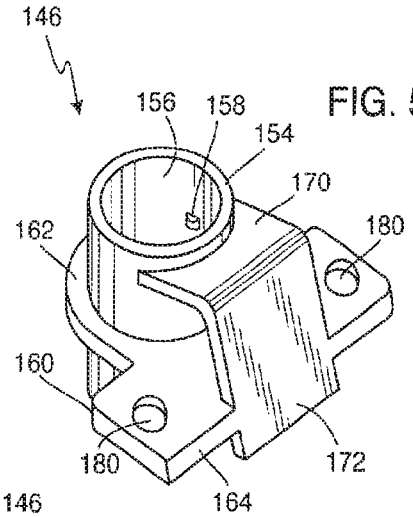
FIG. 5 is a perspective view of the rung anchor of the swimming pool ladder of FIG. 4 showing a cylinder body including a protuberance formed therein, a load bearing flange having a pair of penetrations formed therein, a first coplanar surface and a second coplanar surface.
Figure 6:
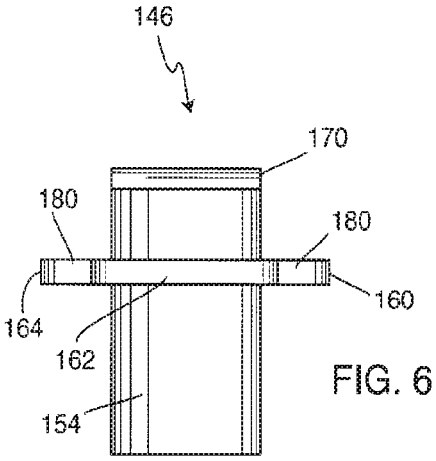
FIG. 6 is a front elevation of the rung anchor of FIG. 5 showing the cylinder body and load bearing flange.
Figure 8:
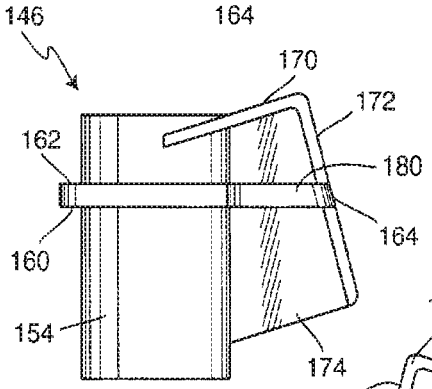
FIG. 8 is a left side elevation of the rung anchor of FIG. 5 showing the cylinder body, load bearing flange, first coplanar surface, second coplanar surface and the support member.
Figure 7:
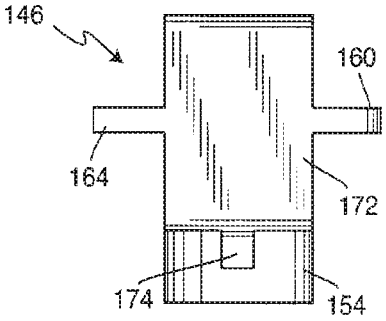
FIG. 7 is a rear elevation of the rung anchor of FIG. 5 showing the cylinder body, load bearing flange, second coplanar surface, and a support member.
Figure 9:
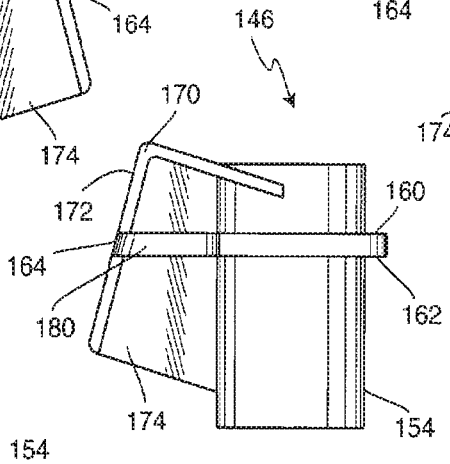
FIG. 9 is a right side elevation of the rung anchor of FIG. 5 showing the cylinder body, load bearing flange, first coplanar surface, second coplanar surface and the support member.
Figure 10:
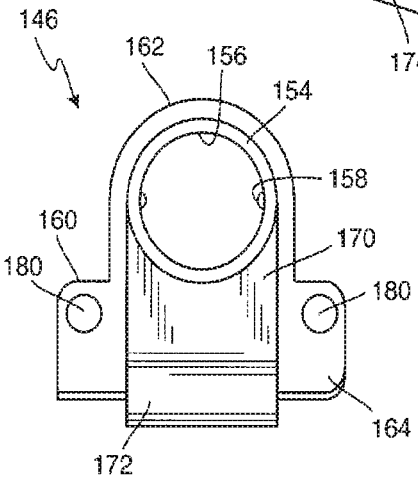
FIG. 10 is a top plan view of the rung anchor of FIG. 5 showing the cylinder body including a pair of the protuberances formed therein, load bearing flange including the pair of penetrations formed therein, first coplanar surface and second coplanar surface.
Figure 11:
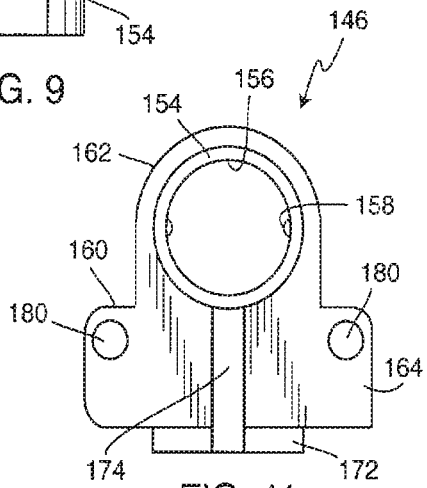
FIG. 11 is a bottom plan view of the rung anchor of FIG. 5 showing the cylinder body including the pair of protuberances formed therein, load bearing flange including the pair of penetrations, second coplanar surface, and support member.

The present invention is a swimming pool ladder 100 for use with a large capacity above-the-ground swimming pool 102 typically erected in the out-of-doors as is shown in FIG. 1. The inventive swimming pool 100 includes a first ladder section 104 and a second ladder section 106 which are both mechanically connected to a top platform 108 as best shown in FIGS. 1, 2, and 4. Once assembled and ready for use, the first ladder section 104 is mounted on, for example, the ground side, i.e., mounted external to the swimming pool 102. However, the second ladder section 106 is mounted within the swimming pool 102. Thus, the swimming pool ladder 100 straddles a sidewall 110 of the swimming pool 102. As shown in FIG. 1, the assembled swimming pool ladder 100 enables a bather to conveniently enter and exit the swimming pool 102. The construction of the swimming pool ladder 100 resembles an A-frame as is best shown in FIGS. 1 and 2. The invention will now be described in more detail.

In a preferred embodiment, the swimming pool ladder 100 includes the first ladder section 104 and the second ladder section 106 as shown in FIGS. 1 and 2. It is noted that each of the ladder sections 104 and 106 are identical, i.e., the first ladder section 104 is a mirror image or duplicate of the second ladder section 106 and vice versa. Consequently, description of the components of structure of the first ladder section 104 applies equally to the components of structure of the second ladder section 106 and vice versa.

Referring now to the first ladder section 104 (and also to the identical ladder section 106), a pair of J-shaped side rails 112 are employed to form a ladder frame. In other words, each of the first and second ladder sections 104 and 106, respectively, includes the pair of J-shaped side rails 112 which forms the basic framework of the inventive swimming pool ladder 100. The J-shaped side rails 112 are comprised of rigid cylindrical metal tubing and can be comprised of, for example, aluminum or other suitable metal. The length of each J-shaped side rail 112 is a function of the height of the swimming pool ladder 100 which is dependent upon the size of the swimming pool 102 shown in phantom in FIG. 1. The large capacity, out-of-doors, above-the-ground swimming pool 102 typically has the capacity to hold over one-thousand gallons of water and can accommodate several adults and children at any one time. Different size swimming pools 102 can vary in height. Since the height of the swimming pool sidewall 110 can vary, the length of the corresponding J-shaped side rails 112 can vary for different size swimming pools 102. Notwithstanding, the length of the typically J-shaped side rail 112 can be, for example, approximately 68"-70" when fully assembled which includes the top platform 108.

The bottom end 114 of each side rail 112 is fanned out so that the cylindrical metal tubing exhibits somewhat less than a ninety degree turn so that it appears to be J-shaped as shown in FIGS. 1-4. This design broadens the bottom end 114 of each of the J-shaped side rails 112 to provide lateral stability and support to the first and second ladder sections 104 and 106. This feature is in compliance with the guidelines of the American National Standards Institute (ANSI) as it relates to swimming pool ladders in general. Additionally, mounted on the bottom end 114 of each of the J-shaped side rails 112 is a foot cap 116 as shown in FIGS. 1-4. The foot cap 116 is typically comprised of a plastic polymer such as, for example, polyvinylchloride and is employed to improve the footing of each of the J-shaped side rails 112. The plastic polymer that forms each foot cap 116 is corrugated and thus is able to improve the footing by increasing the friction between each J-shaped side rail 112 and the surface upon which it is mounted. Additionally, the plastic polymer of the foot cap 116 mounted on the bottom end 114 of the J-shaped side rails 112 of the second ladder section 106 is not likely to tear the bottom plastic liner (not shown) of the swimming pool 102.

A top end 118 of each of the J-shaped side rails 112 exhibits a reduction in diameter for interfacing with the top platform 108 and a pair of safety hand rails 119 as is clearly shown in the exploded view of FIG. 4. Just below each of the top ends 118 in each of the side rails 112 is a first penetration 120. Likewise, a second penetration 122 is formed in the top end 118 of each of the J-shaped side rails 112 as shown in FIG. 4. The first penetration 120 and the second penetration 122 formed in each of the J-shaped side rails 112 are to be employed for fastening or connecting each of the side rails 112 respectively to the top platform 108 and to the pair of safety hand rails 119 mounted above the top platform 108 as shown in FIG. 4 and described herein below.

The top platform 108 is rectangular in shape and is comprised of a heavy duty plastic polymer such as Acrylonitrile Butadiene Styrene (ABS) or Polyvinylchloride (PVC). One of the functions of the top platform 108 is to serve as a passageway between the first ladder section 104 and the second ladder section 106. This is possible since the pair of J-shaped side rails 112 of the first ladder section 104 and the pair of J-shaped side rails 112 of the second ladder section 106 each connect to the top platform 108. The top platform 108 also serves to enable the top end 118 of each of the J-shaped side rails 112 to connect to a corresponding one of a plurality of hollow terminal ends 126 of the pair of safety hand rails 119. The top platform 108 also includes a downward extending skirt 128 on each side of a non-slip rectangular top surface 130.

At each corner of the top platform 108 defined by the intersection of the rectangular top surface 130 and a pair of the downward extending skirts 128, a cylindrical channel 132 is formed. The cylindrical channel 132 formed in each corner of the top platform 108 is set at an angle somewhat greater than ninety degrees. Each of the four cylindrical channels 132 further includes a third penetration 134 on the outer surface Of the channel 132 and a slot 136 (not shown) formed on the inner surface of the channel 132. Each of the third penetrations 134 is aligned with the corresponding slot 136 to enable the passage of a fastener there through. Additionally, the platform 108 includes a pair of vertical signboards 138 attached to opposing downward extending skirts 128 with plastic fasteners (not shown). The signboards 138 are utilized to post safety and warning messages to bathers.

Figure 3:
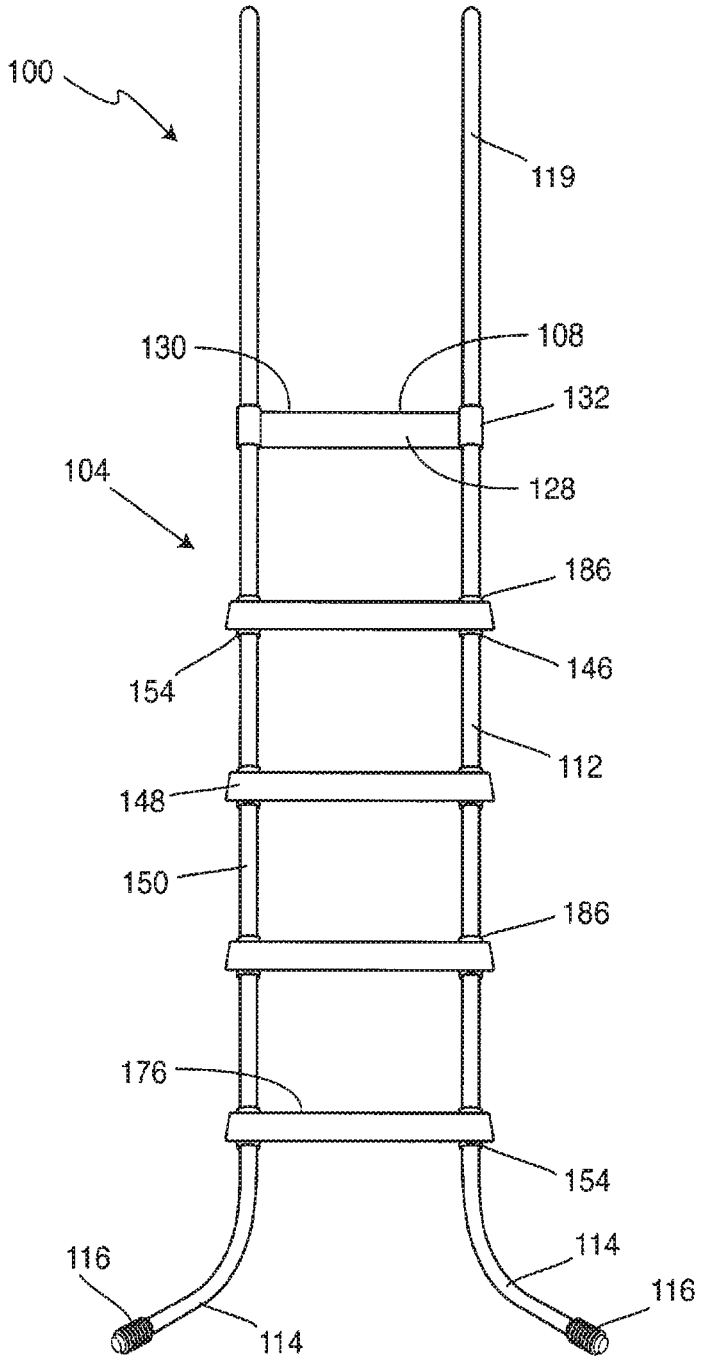
FIG. 3 is a front elevation of the swimming pool ladder of FIG. 1 showing the pair of J-shaped side rails having the plurality of rungs suspended there between, top platform and top hand rail.

The pair of safety hand rails 119 are shown mounted above the top platform 108 is FIGS. 1-3 and also shown exploded away from the platform 108 in FIG. 4. The pair of safety hand rails 119 are shaped so that the hollow terminal ends 126 are downward extending. Further, each of the hollow terminal ends 126 includes a fourth penetration 140 formed there through. During assembly, the top end 118 of each of the J-shaped side rails 112 is extended through the corresponding cylindrical channel 132 of the top platform 108. The top platform 108 settles on that portion of the side rail 112 below the top end 118. The first penetration 120 in the side rail 112 is then aligned with the third penetration 134 formed in the cylindrical channel 132 of the platform 108. One of a plurality of fasteners 142, such as, for example, a threaded bolt and nut is then passed through the third penetration 134 of the platform 108 and the first penetration 120 of the side rail 112. The end of the bolt of the fastener 142 is then passed through the slot 136 (not shown) underneath the top platform 108 so that the nut can be applied.

After this task is accomplished, the top end 118 of the side rail 112 is extending above the cylindrical channel 132 of the platform 108. One of the hollow terminal ends 126 of each of the safety hand rails 119 is placed over the top end 118 of the corresponding side rail 112. Thereafter, the fourth penetration 140 of the corresponding safety hand rail 119 is aligned with the second penetration 122 formed in the top end 118 of the corresponding side rail 112 and one of the plurality of fasteners 142 is passed there through. Once each of the fasteners 142 is secured, the platform 108 is attached to and stabilized by the J-shaped hand rails 112 and the safety hand rails 119 are secured to the top platform 108. Disassembly is achieved by the reverse of this procedure.

Figure 12:
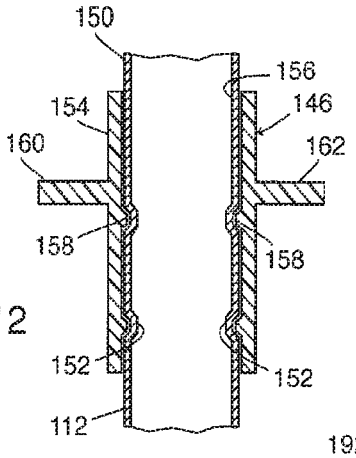
FIG. 12 is a cross-sectional view of a rung anchor mounted on a J-shaped side rail taken along line 12-12 of FIG. 15 showing the side rail having a pair of compression indentations formed thereon, the cylinder body of the rung anchor including the load bearing flange and the plurality of protuberances.

Each of the pair of J-shaped side rails 112 for both the first ladder section 104 and the second ladder section 106 includes a plurality of rung anchors 146 permanently affixed to the side rails 112 as is clearly shown in FIG. 4. The primary function of the rung anchors 146 is to support a corresponding plurality of rungs 148 which in turn support the body weight of the bather climbing the inventive swimming pool ladder 100. When the J-shaped side rails 112 are assembled with the remainder of the components of each of the first ladder section 104 and the second ladder section 106, the rung anchors 146 are already installed, i.e., the rung anchors 146 are pre-attached during the manufacturing stage. The method of attachment of each of the rung anchors 146 to the side rails 112 is illustrated in the cross-sectional view of FIG. 12. Each of the J-shaped side rails 112 includes an outer surface 150. Further, the outer surface 150 of each of the side rails 112 includes a plurality of compression indentations 152 which are formed into the side rails 112 typically at 180 mechanical degrees during the manufacturing stage. The compression indentations 152 can be formed in the side rails 112 in pairs in close proximity and the pairs of compression indentations 152 are typically positioned along the side rails 112 at into rails of approximately 8"-10" from the bottom end 114 to the top end 118. The positioning of the compression indentations 152 along the length of the side rails 112 is indicated by the position of the rung anchors 146 in FIG. 4. Likewise, the positioning of the rung anchors 146 occurs at the locations of the corresponding rungs 148.

Each of the plurality of step anchors 146 includes a cylinder body 154 that encloses a portion of the corresponding side rail 112. Thus, an inner surface 156 of the cylinder body 154 of each of the rung anchors 146 is in physical contact with outer surface 150 of the side rails 112. The inner surface 156 of the cylinder body 154 of each of the plurality of rung anchors 146 includes a pair of protuberances 158 formed thereon. The situs of each of the pair of protuberances 158 correspond to and cooperate with the location of the corresponding compression indentations 152 formed on the outer surface 150 of each of the side rails 112. Consequently, each of the plurality of rung anchors 146 is mechanically attached to the outer surface 150 of the corresponding J-shaped side rail 112.

In addition to the mechanical connection between each of the rung anchors 146 and the corresponding side rail 112, each of the rung anchors 146 is also ultrasonically welded to the corresponding side rail 112. Ultrasonic welds are well known in the art and includes the use of sound waves to create kinetic energy which in turn generates heat. The generation of heat results in the melting of components in contact to form a bonded joint. Each of the plurality of rung anchors 146 is an injection molded part that can be comprised of a plastic polymer, for example, nylon or in the alternative another high strength plastic. By the use of ultrasonic welding, each of the rung anchors 146 is welded directly to the corresponding J-shaped side rail 112 as is shown in FIG. 4. Thus, the mechanical connection comprising the pair of protuberances 158 seated within the compression indentations 152 in combination with the ultrasonic welds serve to maintain each of the rung anchors 146 in position along the corresponding J-shaped side rail 112. The attachment of each of the rung anchors 146 is robust since each rung anchor 146 is capable of supporting in excess of six-hundred pounds of weight. This design criteria exceeds the relevant American National Standards Institute (ANSI) recommendations.

Each of the plurality of rung anchors 146 includes a load bearing flange 160 formed upon an exterior surface of the cylinder body 154 as is clearly shown in FIGS. 5-11. The load bearing flange 160 is injection molded directly onto the exterior surface of the cylinder body 154 and thus is normally comprised of the same plastic polymer. The load bearing flange includes a forward portion 162 and a rearward portion 164 best shown in FIGS. 5 and 6. The function of the forward portion 162 of the load bearing flange 160 is to be received by a groove 166 formed in a U-shaped opening 168 on a rear surface 178 of each of the plurality of rungs 148 as is shown clearly in FIGS. 15 and 18. The forward portion 162 of the load bearing flange 160 expands into the rearward portion 164 having a broader surface area. The overall function of the load bearing flange 160 is to provide support to the corresponding rung 148 to which it is connected. This is accomplished by designing the load bearing flange 160 to be entirely received by the groove 166 formed in the U-shaped opening 168 of each rung 148. Thus, the entire load placed on any particular rung 148 is transferred to and carried by the load bearing flange 160. It is anticipated that the body weight placed on each rung 148 will be supported because the polymer structure of the load bearing flange 160 does not begin to deform until the weight exceeds 600 pounds. This weight surpasses the American National Standards Institute (ANSI) recommendation of 400 pounds.

Each of the rung anchors 146 also includes a pair of coplanar surfaces including a first coplanar surface 170 and a second coplanar surface 172. The first coplanar surface 170 is also injection molded to the cylinder body 154 and extends upward at a slight angle from the horizontal. The second coplanar surface 172 is injection molded to the first coplanar surface 170, load bearing flange 160, and to a support member 174. The support member 174 is injection molded to the cylinder body 154, load bearing flange 160, and first coplanar surface 170 in addition to the second coplanar surface 172. The function of the support member 174 is to provide rigidity and strength to each of the rung anchors 146. The first coplanar surface 170 and the second coplanar surface 172 correspond to and cooperate with the construction of each corresponding rung 148.

The first coplanar surface 170 of each rung anchor 146 aligns with a top surface 176 of the corresponding rung 148. Thus, the first coplanar surface 170 is a surface that is planar (i.e., occurs in the same plane) with the top surface 176 of the corresponding rung 148. Additionally, the second coplanar surface 172 of each rung anchor 146 aligns with a rear surface 178 of the corresponding rung 148. Consequently, the second coplanar surface 172 is a surface that is planar (i.e., occurs in the same plane) with the rear surface 178 of the corresponding rung 148. Therefore, when a rung 148 is mounted upon a corresponding rung anchor 146 on a side rail 112, the U-shaped opening 168 formed in each rung 148 is closed as is shown in FIG. 16. In other words, the first coplanar surface 170 and the second coplanar surface 172 of each rung anchor 146 causes the top surface 176 and the rear surface 178, respectively, of each rung 148 to be continuously smooth. Additionally, the broad surface area of the rearward portion 164 of the load bearing flange 160 includes a pair of penetrations 180. Each of the penetrations 180 serves to receive and pass one of a plurality of slotted retainer pins 182 as shown in FIGS. 13-16 but particularly in FIG. 14.

Figure 13:
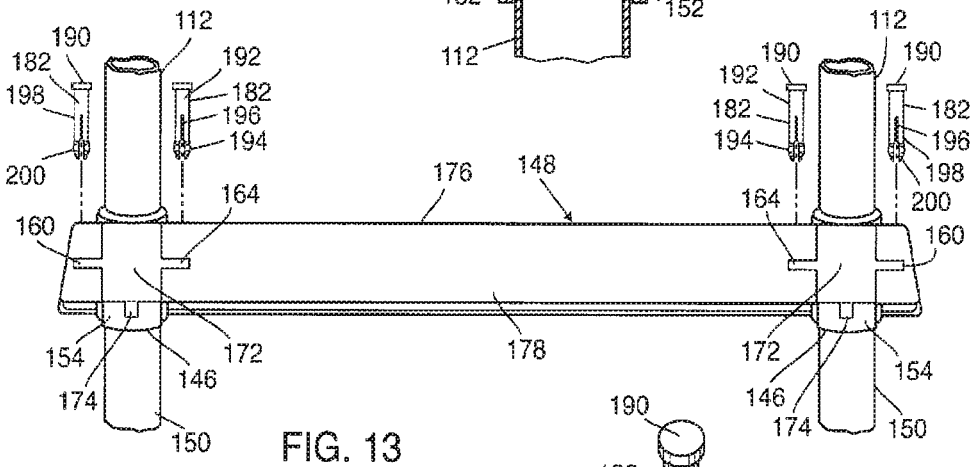
FIG. 13 is a rear elevation of the swimming pool ladder of FIG. 3 showing the rung anchors mounted on the J-shaped side rails and the rung mounted upon the rung anchors with the retainer pins and supported by the load bearing flange.
Figure 15:
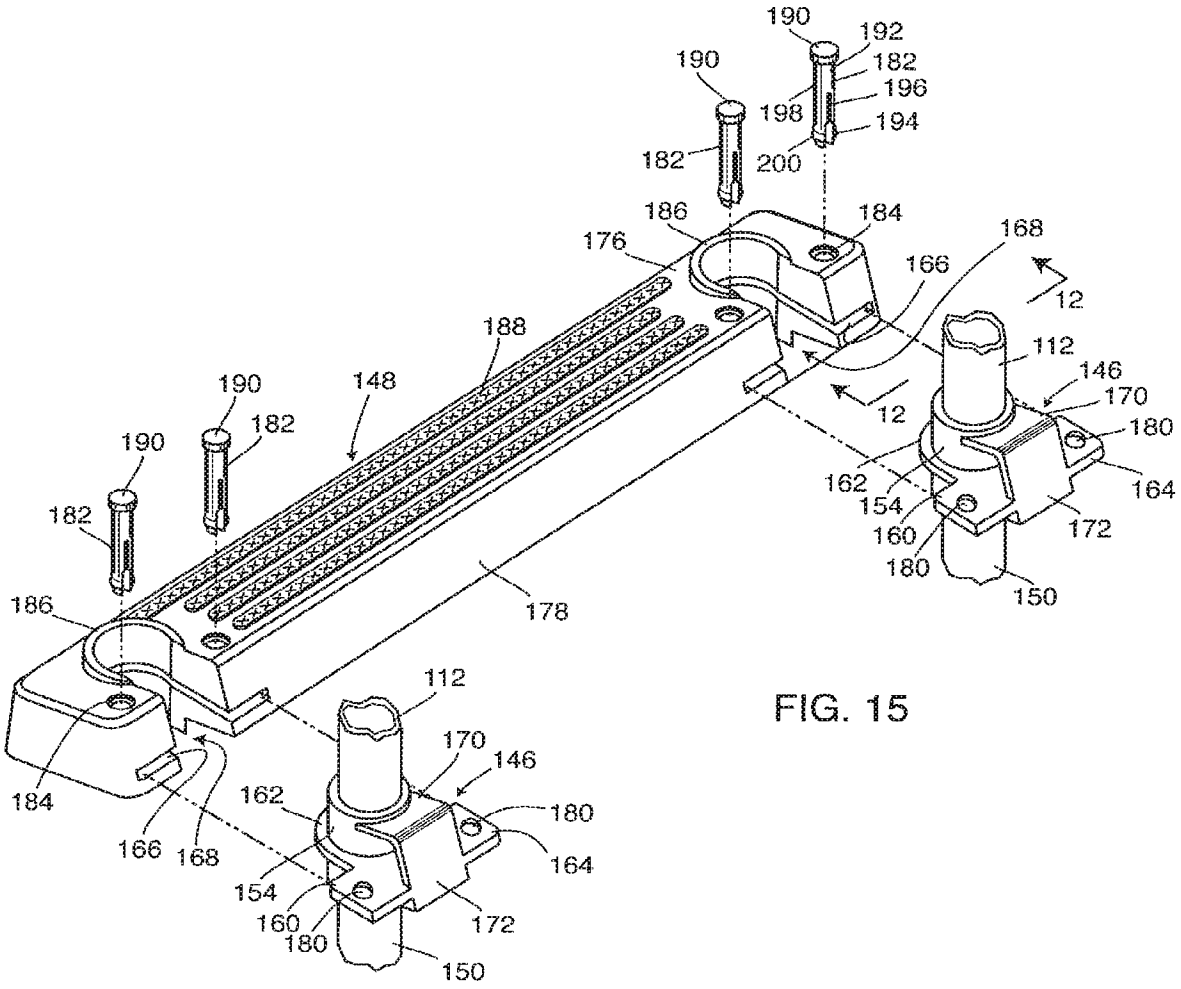
FIG. 15 is a perspective view of the swimming pool ladder of FIG. 1 showing a rung with a pair of the rung anchors exploded away and the slotted retainer pins aligned with the corresponding penetrations in the rung.
Figure 16:
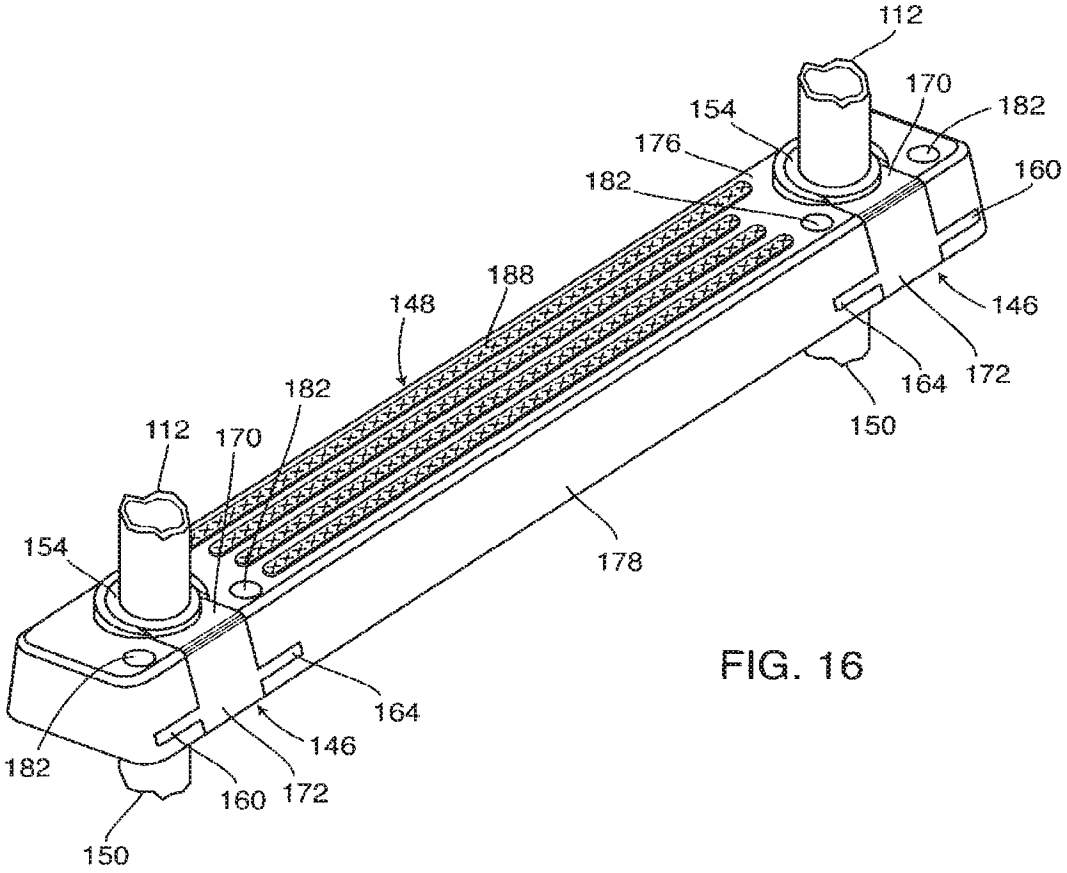
FIG. 16 is another perspective view of the swimming pool ladder of FIG. 1 showing the rung with the pair of rung anchors assembled and the slotted retainer pins installed.
Figure 17:
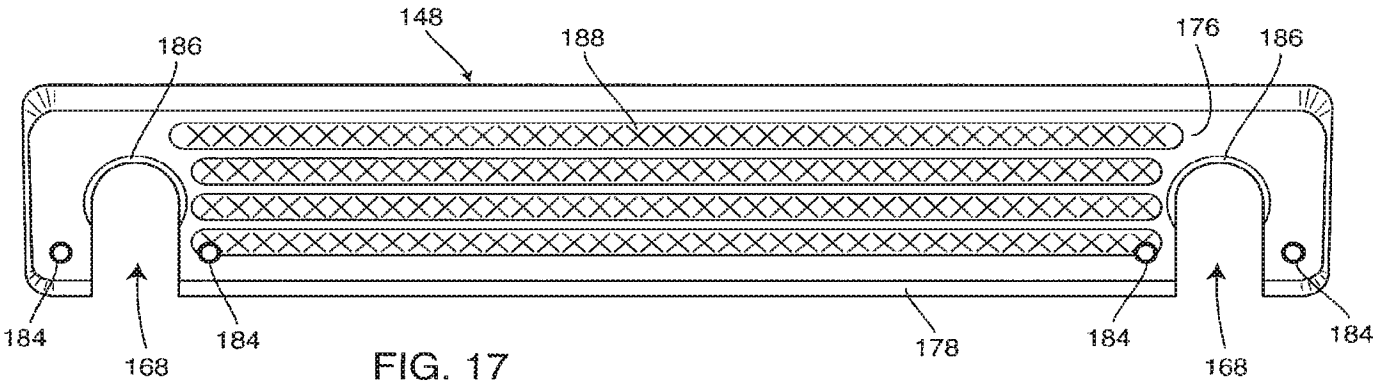
FIG. 17 is a top planar view of one of the plurality of rungs of FIG. 1 with the rung anchors removed and showing the non-skid surface on the top of the rung.
Figure 18:
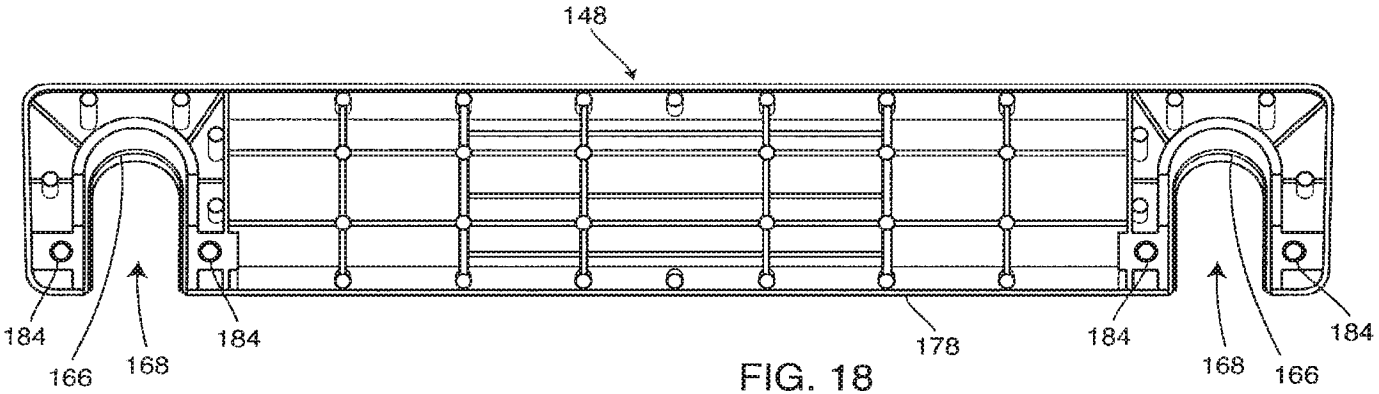
FIG. 18 is a bottom planar view of one of the plurality of rungs of FIG. 1 showing the high strength plastic lattice structure.

Each of the plurality of rungs 148 is generally rectangular in shape as shown in FIGS. 15-17 and is comprised of a plastic polymer such as, far example, Acrylonitrile Butadiene Styrene (ABS) or Polyvinylchloride (PVC). The top surface 176 of each of the rungs 148 comprises a non-slip surface design and includes a plurality of four penetrations 184 that vertically pass there through as shown in FIGS. 15, 17 and 18. The pair of U-shaped openings 168 are clearly visible in the view of the top surface 176 of each of the rungs 148. The groove 166 formed in the U-shaped opening 168 of each of the rungs 148 is clearly visible in FIGS. 15, 16 and 18. The groove 166 is sized to accommodate the entire load bearing flange 160 formed on each of the rung anchors 146 mounted on the side rails 112 as is shown in FIGS. 13 and 16. Thus, the groove 166 of each U-shaped opening 168 cooperates with the corresponding load bearing flange 160 in a tongue and groove fashion as is shown in FIG. 15.

Each of the U-shaped openings 168 also includes a raised collar 186 which rises above the top surface 176 of each of the rungs 148. The raised collar 186 as part of the structure of each of the rungs 148 assists in securing the cylinder body 154 of the rung anchor 146 in the U-shaped opening 168. In particular, the raised collar 186 provides more surface area in the U-shaped opening 168 of each of the rungs 148 to more securely grasp the cylinder body 154 of the rung anchor 146. The underneath of each of the rungs 148 of the inventive swimming pool ladder 100 is illustrated in FIG. 18. The U-shaped openings 168 and the corresponding grooves 166 are clearly shown. Additionally, the four penetrations 184 formed vertically through each of the rungs 148 are visible. Further, the underneath of each of the rungs 148 includes a lattice structure 188 for increasing the structural integrity of each rung 148 as is clearly shown in FIG. 18.

Figure 14:
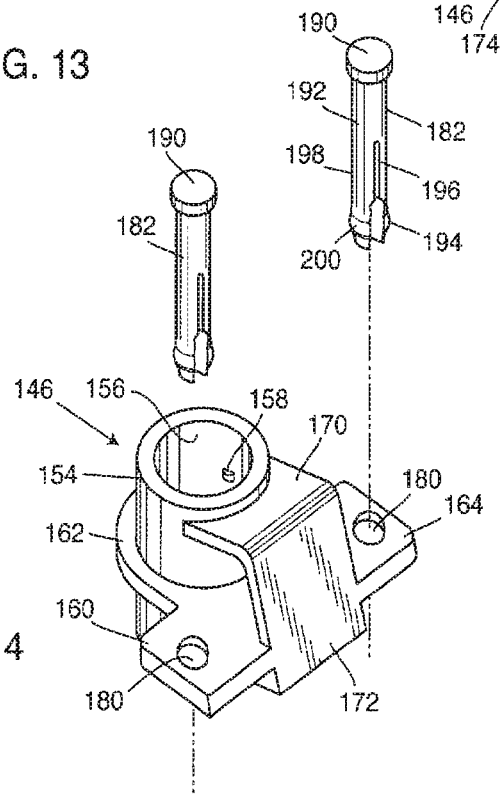
FIG. 14 is a perspective view of the rung anchor of FIG. 5 showing the protuberance formed on the inside of the cylinder body and the slotted retainer pins aligned with the penetrations formed in the load bearing flange.

Each of the plurality of slotted retainer pins 182 serves to enable the convenient assembly and disassembly of each rung 148 to and from the corresponding rung anchor 146. Each retainer pin 182 is also comprised of a suitable plastic polymer, such as nylon, and is shown clearly in FIGS. 14 and 15. Each retainer pin 182 includes a fiat head 190, a slotted cylindrical shaft 192, and a slotted bulbous tip 194. A slot 196 formed in the cylindrical shaft 192 provides a spring action between a pair of legs 198 that form the cylindrical shaft 192 as shown in FIG. 14. The pair of legs 198 that form the cylindrical shaft 192 become a pair of bulb portions 200 that form the bulbous tip 194. The spring action between the pair of legs 198 and consequently between the pair of bulb portions 200 allow the slotted retainer pins 182 to pass through the four penetrations 184 in each of the rungs 148 and the corresponding penetrations 180 formed in the load bearing flange 160. Once inserted, the pair of bulb portions 200 separate, i.e., expand, and lock the retainer pins 182 in position. The flat head 190 of each of the retainer pins 182 lay flush with the top surface 176 of the corresponding rung 148. Upon forcing the bulb portions 200 of the slotted bulbous tip 194 together with finger pressure, the retainer pins 182 can be easily removed.

During assembly of the swimming pool ladder 100 of the present invention, the load bearing flange 160 of each of the rung anchors 146 is aligned with the groove 166 of the U-shaped opening 168 of the corresponding rung 148. By utilizing hand pressure, the load bearing flange 160 is entirely inserted into the groove 166 of the corresponding U-shaped opening 168. Once the rung 148 is mounted upon the corresponding rung anchor 146, the penetrations 184 vertically formed through each rung 148 align with the corresponding penetrations 180 formed through the rearward portion 164 of the load bearing flange 160 as shown in FIGS. 15 and 16. Thereafter, the slotted retainer pins 182 can be inserted through the penetrations 184 in the rungs 148 and the penetrations 180 in the load bearing flange 160 to lock the rung 148 to the rung anchor 146. This procedure is followed until each of the rungs 148 is installed on the corresponding pairs of J-shaped side rails 112 of the first ladder section 104 and the second ladder section 106.

Thereafter, the top platform 108 is installed on the first ladder section 104 and subsequently on the second ladder section 106. Once the top platform 108 is installed on the first ladder section 104, the corresponding safety hand rail 119 is installed. Next, the top platform 108 is installed on the second ladder section 106 and the corresponding safety hand rail 119 is installed. Once the components are assembled, the first penetrations 120 in the side rails 112 are aligned with the third penetrations 134 of the top platform 108. The plurality of fasteners 142 are then installed and secured. Next, the second penetrations 122 in the top ends 118 are aligned with the fourth penetrations 140 in the safety hand rails 119. Thereafter, the plurality of fasteners 142 are then installed and secured. The second ladder section 106 is then positioned within the large capacity, out-of-doors, above-the-ground swimming pool 102 and the first ladder section 104 is positioned on the ground side external to the swimming pool 102. The swimming pool ladder 100 is now ready for use. Reversing the order of this procedure enables the swimming pool ladder 100 to be disassembled.

The present invention provides novel advantages over other swimming pool ladders known in the prior art. A main advantage of the swimming pool ladder 100 for use with large capacity, out-of-doors swimming pools 102 of the present invention is that it comprises a simple yet robust design particularly in relation to attaching the rungs 148 to the corresponding rung anchors 146. Further, the swimming pool ladder 100 is easy and time efficient to assembly and disassemble, is lightweight and transportable, and is easily stored in a small space. Additionally, once assembled, there are no sharp edges or corners to cause injury to children in a swimming pool environment. The design of the swimming pool ladder 100 of the present invention enables adults as well as children to enter and exit the swimming pool 102 in a convenient and safe manner. Further, the ladder design of the present invention eliminates many of the articulated and mechanical components present in prior art pool ladders which made assembly, use and disassembly difficult and inconvenient.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention.

What is claimed is:

1. A swimming pool ladder for use with a large capacity swimming pool comprising:

a first ladder section connected to a second ladder section by a top platform for providing an entry and an exit to a large capacity swimming pool;

each ladder section comprising:

a pair of J-shaped side rails for providing a ladder frame;

a plurality of rung anchors welded to said side rails for supporting a plurality of rungs, each of said rung anchors including a load bearing flange molded to an exterior surface of a cylinder body of said rung anchors, and each of said rungs having a pair of U-shaped openings formed at a rear surface of said rungs and a pair of grooves formed within said U-shaped openings for receiving and cooperating with one of said rung anchors and said corresponding load bearing flange; and a plurality of retainer pins for removably securing said rungs to said rung anchors.

2. The swimming pool ladder of claim 1 wherein each of said rungs is comprised of a high strength plastic polymer.

3. The swimming pool ladder of claim 1 wherein each of said rung anchors is comprised of a high strength plastic.

4. The swimming pool ladder of claim 1 wherein said top platform further includes a pair of safety hand rails.

5. The swimming pool ladder of claim 1 wherein each of said side rails is comprised of metal tubing.

6. The swimming pool ladder of claim 1 wherein each of said side rails further includes a foot cap.

7. The swimming pool ladder of claim 1 wherein each of said retainer pins is a slotted retainer pin having a slotted bulbous tip, said pins comprised of plastic.

8. The swimming pool ladder of claim 1 wherein said cylinder body includes a plurality of protuberances formed therein for cooperating With a corresponding plurality of compression indentations formed on said side rails for securing said rung anchors to said side rails.

9. The swimming pool ladder of claim 1 wherein each of said rung anchors further includes a first coplanar surface for aligning with a top surface of a corresponding one of said rungs.

10. The swimming pool ladder of claim 9 wherein each of said rung anchors further includes a second coplanar surface for aligning with a rear surface of a corresponding one of said rungs.

11. The swimming pool ladder of claim 1 wherein each of said rung anchors further includes a support member for supporting said load bearing flange.

12. The swimming pool ladder of claim 1 wherein said load bearing flange of each of said rung anchors further includes a pair of penetrations for receiving said plurality of retainer pins.

13. The swimming pool ladder of claim 1 wherein each of said rungs further includes a plurality of penetrations formed vertically through said rungs for receiving said plurality of retainer pins.

14. The swimming pool ladder of claim 1 wherein each of said rungs includes an under surface having a reinforced lattice structure.

15. A swimming pool ladder for use with a large capacity swimming pool comprising:

a first ladder section connected to a second ladder section by a top platform for providing an entry and an exit to a large capacity swimming pool;

each ladder section comprising:

a pair of J-shaped side rails for providing a ladder frame;

a plurality of rung anchors welded to said side rails for supporting a plurality of rungs, each of said rung anchors including a load bearing flange molded to an exterior surface of a cylinder body of said rung anchors, and each of said rungs having a pair of U-shaped openings formed at a rear surface of said rungs and a pair of grooves formed within said U-shaped openings for receiving and cooperating with said cylinder body and said load bearing flange of one of said rung anchors; and a plurality of retainer pins for removably securing said rungs to said rung anchors.

16. The swimming pool ladder of claim 15 wherein each of said rung anchors further includes a first coplanar surface for aligning with a top surface of a corresponding one of said rungs.

17. The swimming pool ladder of claim 16 wherein each of said rung anchors further includes a second coplanar surface for aligning with a rear surface of a corresponding one of said rungs.

18. A swimming pool ladder for use with a large capacity swimming pool comprising:

a first ladder section connected to a second ladder section by a top platform for providing an entry and an exit to a large capacity swimming pool;

each ladder section comprising:

a pair of J-shaped side rails for providing a ladder frame;

a plurality of rung anchors welded to said side rails for supporting a plurality of rungs, each of said rung anchors including a load bearing flange molded to an exterior surface of a cylinder body of said rung anchors, a first coplanar surface for aligning with a top surface of a corresponding one of said rungs, and a second coplanar surface for aligning with a rear surface of a corresponding one of said rungs, each of said rungs having a pair of U-shaped openings formed at a rear surface of said rungs and a pair of grooves formed within said U-shaped openings for receiving and cooperating with one of said rung anchors and said corresponding load bearing flange; and a plurality of retainer pins for removably securing said rungs to said rung anchors.

* * * * *